(12) United States Patent
Lou et al.

(10) Patent No.: US 7,864,547 B2
(45) Date of Patent: Jan. 4, 2011

(54) POWER SUPPLY MODULE ADAPTED TO POWER A CONTROL CIRCUIT OF A SWITCHING MODE POWER SUPPLY

(75) Inventors: Junshan Lou, Shanghai (CN); Daofei Xu, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 351 days.

(21) Appl. No.: 12/109,907

(22) Filed: Apr. 25, 2008

(65) Prior Publication Data

US 2009/0109714 A1 Apr. 30, 2009

(30) Foreign Application Priority Data

Oct. 29, 2007 (TW) ............................... 96140563 A

(51) Int. Cl.
*H02M 3/335* (2006.01)
(52) U.S. Cl. .................. 363/21.06; 363/19; 323/288
(58) Field of Classification Search ............... 323/282, 323/284, 288, 272, 222; 363/16–20, 21.07, 363/21.06, 21.14, 97, 127, 131
See application file for complete search history.

(56) References Cited

U.S. PATENT DOCUMENTS

| | | | | |
|---|---|---|---|---|
| 5,341,179 A * | 8/1994 | Konishi | ....................... | 348/730 |
| 6,462,525 B1 * | 10/2002 | Chen | ........................... | 323/285 |
| 6,490,179 B1 * | 12/2002 | Boylan et al. | ............ | 363/21.06 |
| 6,853,562 B2 * | 2/2005 | Zhang | ..................... | 363/21.06 |
| 7,230,838 B2 * | 6/2007 | Xu | ............................... | 363/86 |
| 7,773,398 B2 * | 8/2010 | Kyono | ........................ | 363/127 |

FOREIGN PATENT DOCUMENTS

CN 2819622 Y 9/2006

* cited by examiner

*Primary Examiner*—Rajnikant B Patel
(74) *Attorney, Agent, or Firm*—Patterson Thuente Christensen Pedersen, P.A.

(57) ABSTRACT

A power supply module to power the control circuit of a switching mode power supply is provided. Based on the determination of whether the switching mode power supply is under a light or open load condition, the power supply module can dynamically provide the power to the control circuit of the switching mode power supply. Therefore, the performance of the power supply can be increased and the power loss can be decreased when the switching mode power supply is under a light or open load.

13 Claims, 5 Drawing Sheets

POWER SUPPLY MODULE ADAPTED TO POWER A CONTROL CIRCUIT OF A SWITCHING MODE POWER SUPPLY

This application claims the benefit of priority based on Taiwan Patent Application No. 096140563 filed on Oct. 29, 2007 of which the contents are incorporated herein by reference in its entirety.

CROSS-REFERENCES TO RELATED APPLICATIONS

Not applicable.

BACKGROUND OF THE INVENTION

1. Field of the Invention

The present invention relates to a power supply module adapted to power a control circuit of a switching mode power supply. More specifically, the present invention relates to a power supply module adapted to increase the operation efficiency of a switching mode power supply and to decrease the power loss incurred by the control circuit of the switching mode power supply when working in a light load or an open load status.

2. Descriptions of the Related Art

Over recent years, the requirements of the operation efficiency in a switching mode power supply have switched from a focus on the heavy or full load status to both the light and full load status. For example, a well-established American corporation, Intel Corp., has established requirements on the operation efficiency of a power supply so that when the power supply operates with a 5% load, the operation efficiency thereof should be no less than 80%.

When operating under a light load condition, the switching mode power supply is usually controlled to operate in the burst mode to decrease the power loss of the main circuit. And an analysis on the power loss under a light load has revealed that the control circuit loss accounts for a significant portion of the total power loss. Accordingly, it is possible to increase the efficiency of the switching mode power supply in the light load status by decreasing the power loss of control circuit, which may in turn be accomplished by lowering the supply voltage of the control circuit.

FIG. 1 illustrates a conventional switching mode power supply 1. The switching mode power supply 1 comprises a main circuit and a control circuit. For example, the main circuit further comprises an electromagnetic interference (EMI) filter 101, a bridge rectifier 103, a power factor correction circuit 105, an inverting circuit 109, a main transformer 111, a rectifier 115 and an output filter 119. The control circuit further comprises a power factor correction controller 107, a controller chip 117, a feedback circuit 121 and a protection circuit (not shown). The inverting circuit 109 may be a half-bridge structure, a full-bridge structure, and so on. The operations and functions of these elements are well-known by those skilled in the art, and therefore will not be described again.

Now, only the structure of the switching mode power supply 1 will be described. The power supply module of the switching mode power supply 1 typically supplies power to the control circuit of power supply 1. In the switching mode power supply 1, the power supply module includes a bias winding 113 coupled to the main transformer 111 and a filter module (not shown) which is coupled to the bias winding 113 and filters the voltage generated by the bias winding 113 and outputs a DC voltage to power the control circuit.

To increase the efficiency of the main circuit in this structure at rated power output condition, the secondary winding of the main transformer 111 is always designed to have a small number of turns. For instance, for a circuit with a rated output voltage of 19.5 V, if the secondary winding is designed to be three turns, then there will be three possibilities for the number of turns of the bias winding 113: one turn, two turns, or three turns. If the bias winding 113 has one turn, the output voltage generated by the bias winding would be only 6.5 V, regardless of the cross-regulation ratio. Thus the controller chip 117 would fail to work because its operating voltage threshold is always set to be at 10 V or higher. If the bias winding 113 has two turns, the output voltage would be 13 V without considering the cross-regulation ratio. Then there is no problem when operating at heavy load condition; however, when the circuit operates under light load condition, the output voltage will fall below the operating voltage range of the control circuit, which still causes control circuit unable to operate. Finally, if the bias winding 113 has three turns, the output voltage will always stay above 16 V, even under a light load. However, a relatively high voltage will be unfavorable for decreasing the power loss incurred by the control circuit under a light load.

Accordingly, efforts still have to be made in the art to enable a power apparatus to operate normally with less power loss incurred by the control circuit under a light load or open load while securing a highly efficient power apparatus in a rated output status.

SUMMARY OF THE INVENTION

One objective of the present invention is to provide a power supply module adapted to power a control circuit of a switching mode power supply. The power supply module comprises a switch circuit, a first supply module, a second supply module and a determination module. The first supply module is connected to the switch circuit, while the second supply module is connected to the switch circuit and connected to the first supply module in parallel. The determination module is configured to determine whether the switching mode power supply is operating under a light or open load status, and to turn on the switch circuit when the switching mode power supply is in the light load status or the open load status so as to enable the first supply module to output a first power to the control circuit.

The power supply module of the present invention is capable of dynamically regulating the way to supply power to the control circuit of the switching mode power supply. The power supply module of the present invention comprises two supply modules, a first supply module of which will provide power when the switch power supply operates under a light or open load. At this point, there are two operating modes for the user to choose: one is to supply power to the control circuit of the switch power supply using only the first supply module, and the other is to supply power to the control circuit of the switch power supply with both supply modules. Either of the operating modes can be implemented in several ways to increase the switching mode power supply efficiency and to decrease the power loss incurred by the control circuit under a light or open load, thus the eliminating the disadvantages of the conventional products.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The embodiments will be described hereinbelow to explain the present invention. The present invention relates to a power supply module, which is configured to dynamically regulate the power supply conditions of itself when the switching mode power supply is operating under a light or open load to increase the efficiency of the switching mode power supply and to decrease the power loss incurred by a control circuit under a light or open load. However, these embodiments are not intended to limit the present invention; that is, the present invention can be embodied in any context, applications or methods. It should be noted that in the following embodiments and attached drawings, elements unrelated to the present invention are omitted from illustration, and the dimensional relationships among the individual elements are exaggerated for purpose of clarity.

Figure 1:
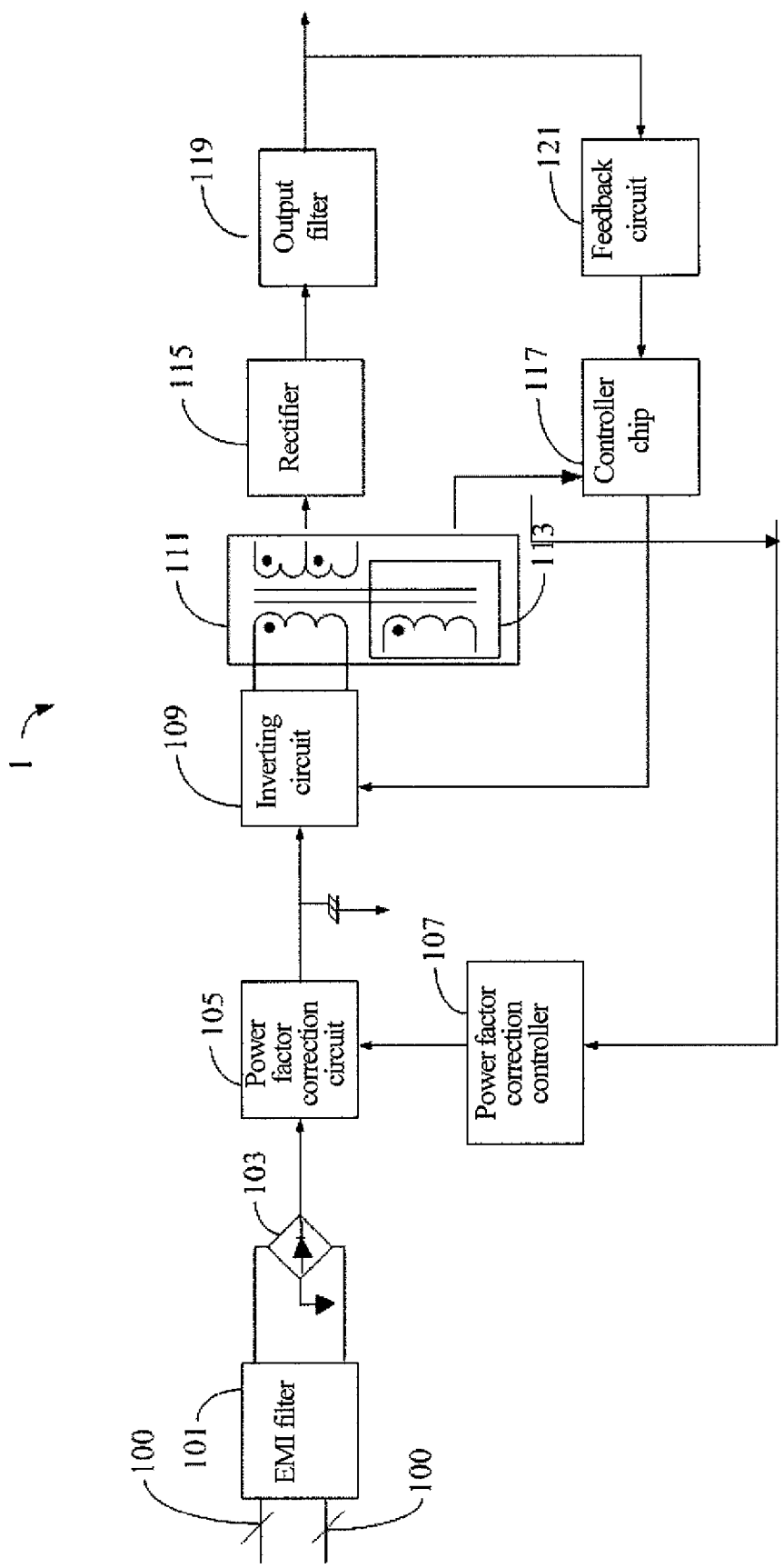
FIG. 1 illustrates a conventional switching mode power supply.
Figure 2:
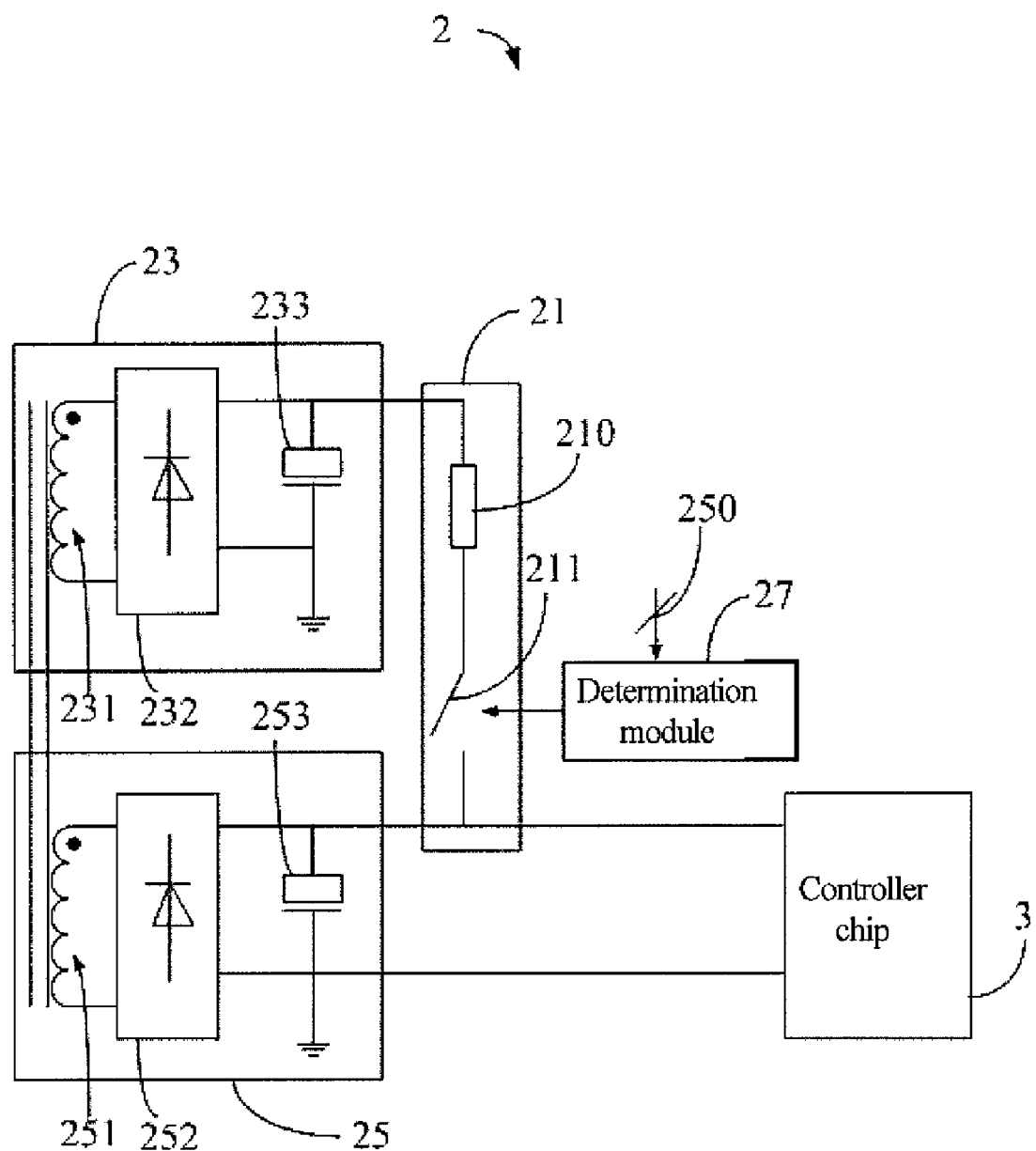
FIG. 2 illustrates the first embodiment of the present invention.

The first embodiment of the present invention is shown in FIG. 2, which illustrates a diagram of a power supply module 2. The power supply module 2 is adapted to power the control circuit of a switching mode power supply. In the first embodiment, the control circuit is a controller chip 3. The power supply module 2 comprises a switch circuit 21, a first supply module 23, a second supply module 25 and a determination module 27. The first supply module 23 is coupled to the switch circuit 21, and the second supply module 25 is coupled to the switch circuit 21 and connected with the first supply module 23 in parallel. Under normal operation, the control circuit of the switching mode power supply is powered by the second supply module 25. However, when the switching mode power supply operates under a light or open load condition, a change will occur in the output voltage levels of the first supply module 23 and the second supply module 25. In response to this, the determination module 27 determines the operating status of the switching mode power supply according to the output voltage levels of the first supply module 23 or the second supply module 25 and turns on the switch circuit 21 to enable the first supply module 23 and the second supply module 25 to output a first power and a second power respectively to the controller chip 3.

More particularly, in the first embodiment, the switch circuit 21 comprises a resistor 210 and a switch element 211. The switch element 211 comprises an input terminal connected to the resistor 210 and an output terminal connected to a power output terminal of the second supply module 25. The resistor 210 is coupled to a power output terminal of the first supply module 23, which controls the current flowing through the switch circuit 21. With such configuration, the first supply module 23 and the second supply module 25 are connected with each other in parallel.

In the first embodiment, the first supply module 23 comprises the winding 231 and a rectification filter module coupled to the winding 231; and the second supply module 25 comprises the winding 251 that are coupled to the same transformer with the winding 231 and the corresponding rectification filter module coupled to the windings the winding 251. Furthermore, the rectification filter module coupled to the winding 231 comprises a rectification filter circuit 232 and a capacitor 233, and the rectification filter module coupled to the winding 251 comprises a rectification filter circuit 252 and a capacitor 253. In other embodiments, the windings 231, 251 may be coupled to the different transformers.

The determination module 27, which is a comparing device (i.e. comparator), is configured to determine the light or open load status of the switching mode power supply by determining whether a voltage level 250 of a second power supplied by the second supply module 25 is lower than a predetermined voltage level. For example, assuming that the predetermined voltage level is 10 V, when the second power has an output voltage level of 9.9 V, the determination module 27 determines that the switching mode power supply is in the light load or the open load status. In response to this determination result, the switch element 211 is closed to turn on the switch circuit 21. Then, the first supply module 23 and the second supply module 25 output the first power and the second power respectively to the controller chip 3. In other words, when the switching mode power supply operates under a light or open load, the second supply module 25 only supplies a portion or none of power needed by the controller chip 3. And the remaining power needed by the controller chip 3 is supplemented or entirely supplied by the first supply module 23.

Similarly, in the other embodiments, the determination module 27 is configured to determine whether the switching mode power supply operates under a light or open load by determining whether the voltage level of the first power supplied by the first supply module 23 is lower than the predetermined voltage level. Operations in this case are similar to those described with respect to the determination of the voltage level 250 of the second power supplied by the second supply module, and therefore will not be described again.

With the above configuration, the power supply module of the present invention is capable of dynamically regulating its power supplying way thereof in response to a light or open load status of the switching mode power supply to maintain the normal operation of the controller chip and to decrease the power loss incurred by the control circuit, thus increasing the operation efficiency of the power supply module.

Figure 3:
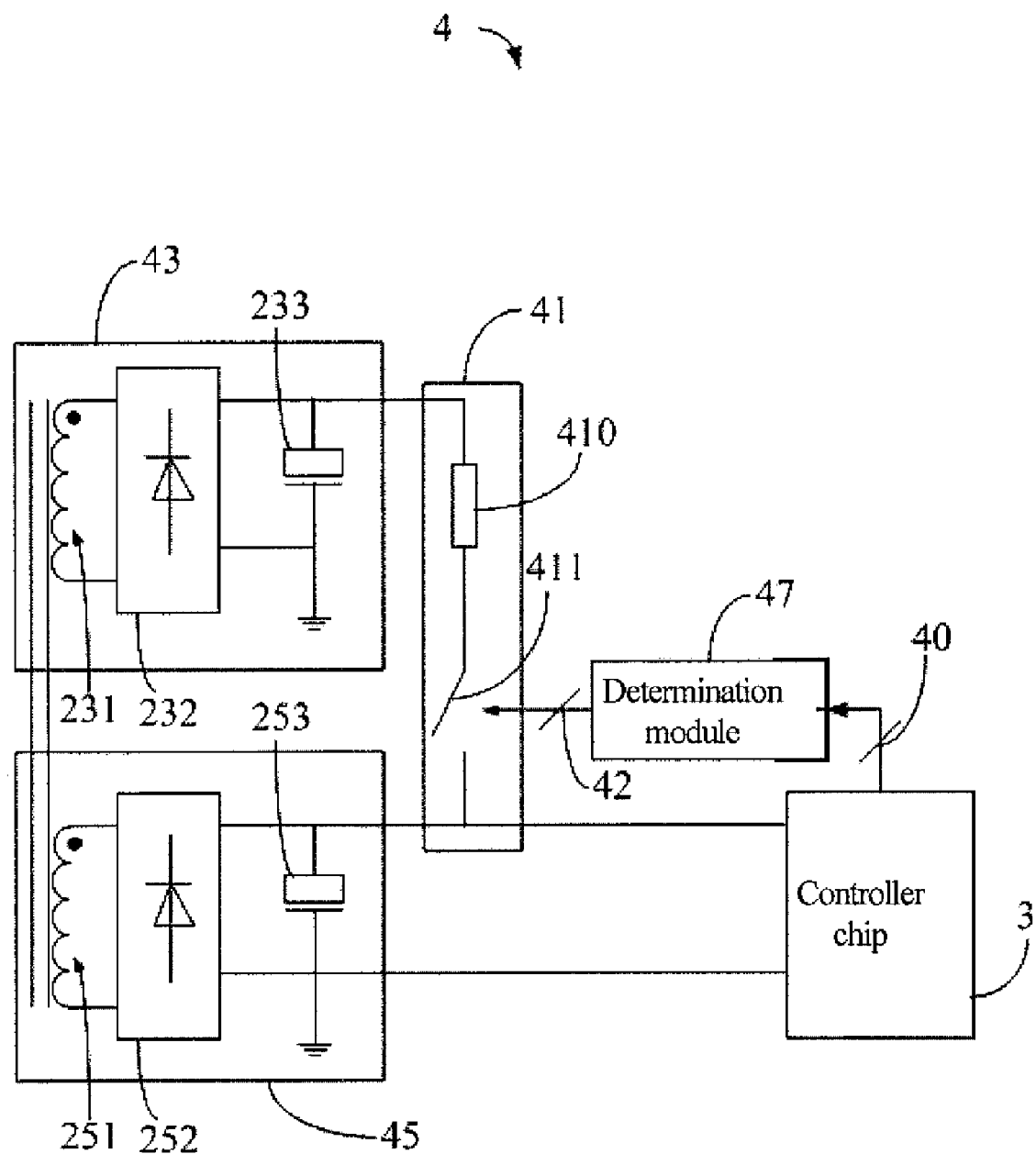
FIG. 3 illustrates the second embodiment of the present invention.

A second embodiment is shown in FIG. 3, which illustrates a power supply module 4. In the second embodiment, the control circuit is still represented by a controller chip 3. The power supply module 4 comprises a switch circuit 41, a first supply module 43, a second supply module 45 and a determination module 47. The switch circuit 41 comprises a resistor 410 and a switch element 411. These modules and circuits are connected in a way similar to that described in the first embodiment, and most of them have the same functions as their counterparts in the first embodiment, so only different portions will be described herein.

In the second embodiment, the determination module 47 is a drive circuit coupled to the controller chip 3. The controller chip 3 is further configured to transmit an operating mode signal 40 to the determination module 47. Upon receiving the operating mode signal 40, the determination module 47 determines whether the switching mode power supply is operating under a light or open load according to the voltage level of the operating mode signal 40. In response to the determination result, the switching mode power supply transmits a control signal 42 to turn on the switch circuit 41.

Figure 4:
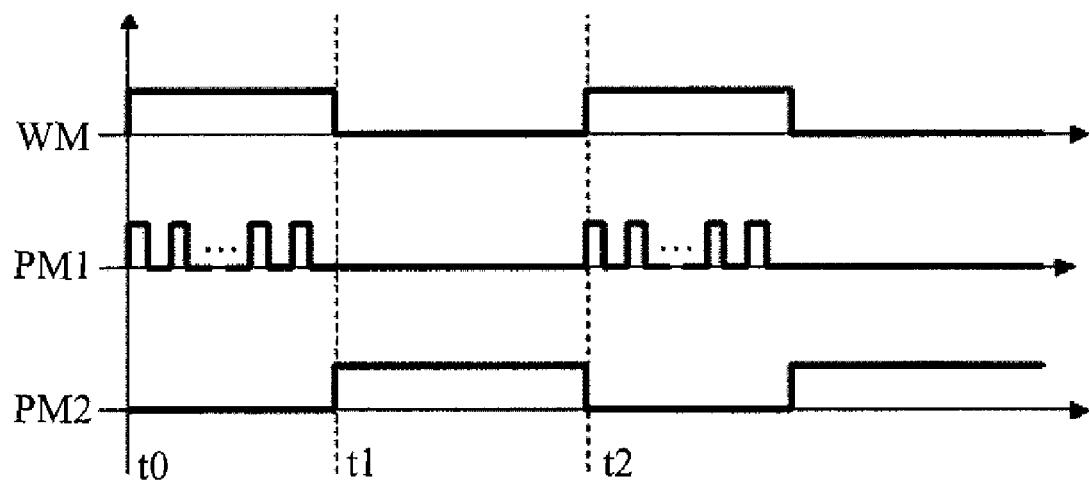
FIG. 4 illustrates the waveforms of the second embodiment.

FIG. 4 illustrates the waveforms corresponding to the power supply module 4 and the controller chip 3. In FIG. 4, the horizontal axis represents time, WM represents the waveform of the operating mode signal 40 received by the determination module 47, PM1 represents the waveform of a control signal of the main switch element in the switching mode power supply employing the power supply module 4, and PM2, which is contrary to WM, represents the waveform of the control signal 42 transmitted by the determination module 47 to the switch element 411. In the second embodiment, in a time interval between time t0 and time t1, WM stays at a high logic level of 1, and PM1 oscillates between the high logic level of 1 and a low logic level of 0, which indicates that the main switch element of the switching mode power supply is under operation. And PM2 stays at the low logic level of 0 to maintain the switch circuit 41 in a turn-off status. At this point, the capacitor 253 receives power energy from the winding 251 through the rectification filter circuit 252 and transfers energy to the control circuit. Then, during a time interval between time t1 and time t2, WM jumps to the low logic level of 0 to indicate that the main switch element of the switching mode power supply is out of operation (i.e., the PM1 is at the low logic level of 0), and then the capacitor 253 fails to obtain power replenishment from the winding 251. During this time interval, PM2 changes to the high logic level (i.e., the switch circuit 41 turns on), and the capacitor 253 is charged by the capacitor 233 to prevent the voltage thereof from falling out of the operating voltage range of the control circuit.

In other embodiments, the resistor 410 may be omitted, where the switch element 411 per se is provided with a current-limiting function, e.g. an MOSFET in a high impedance area.

Figure 5:
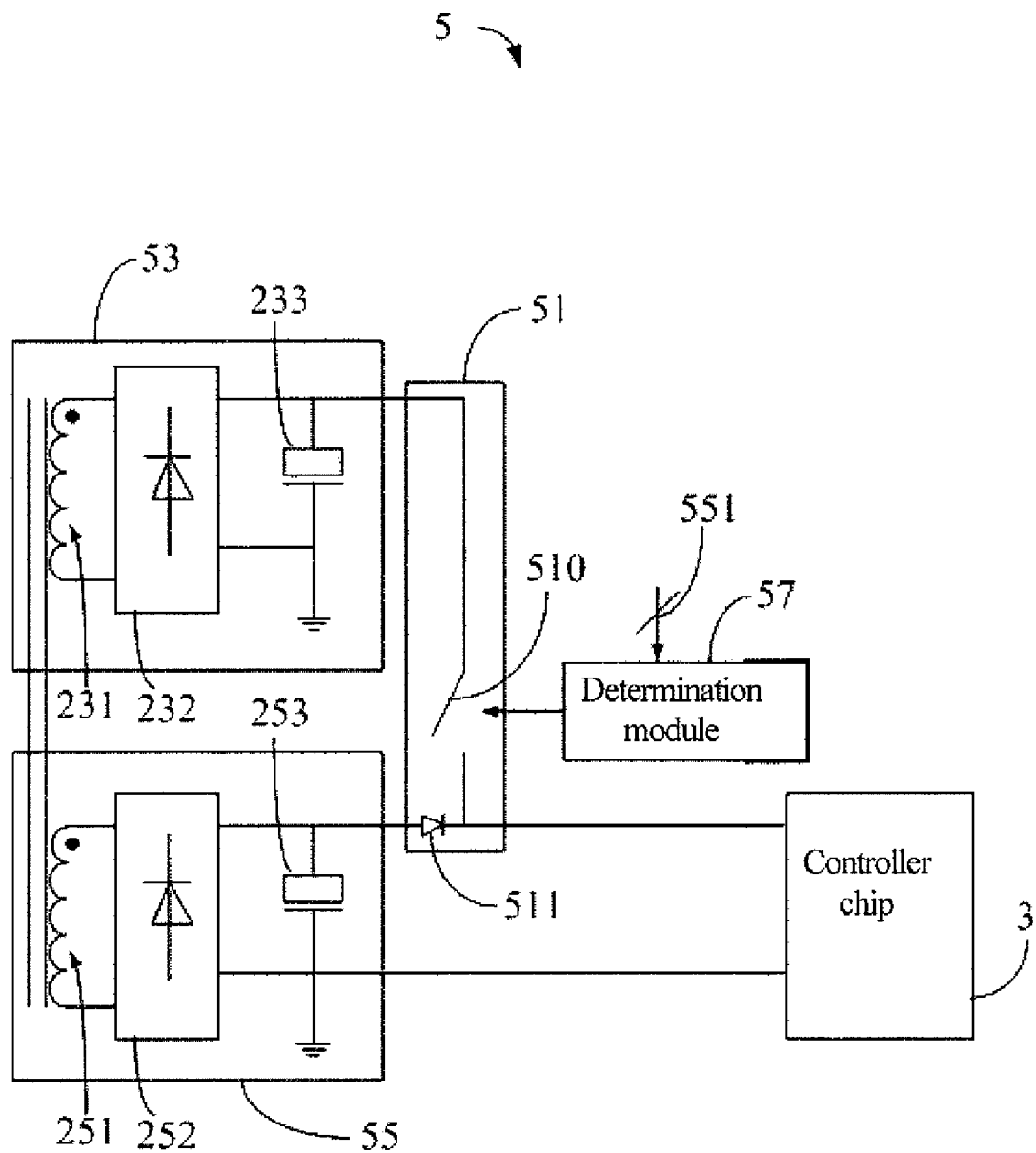
FIG. 5 illustrates the third embodiment of the present invention.

The third embodiment of the present invention is shown in FIG. 5, which illustrates the power supply module 5 adapted to power a control circuit of a switching mode power supply. In the third embodiment, the control circuit is represented by a controller chip 3. The power supply module 5 comprises a switch circuit 51, a first supply module 53, a second supply module 55 and a determination module 57. These elements have functions similar to their counterparts in the first and second embodiments, so only different portions will be described herein.

In the third embodiment, the determination module 57 is not coupled to the controller chip 3. The switch circuit 51 comprises a switch element 510 and a direction element 511. The switch element 510 is coupled to the power output terminal of the first supply module 53. The direction element 511 has a first terminal coupled to a power output terminal of the second supply module 55 and a second terminal coupled to the switch element 510. In the third embodiment, the direction element 511 is a diode with a P electrode thereof acting as the first terminal and an N electrode thereof acting as the second terminal. However, other embodiments are not just limited.

When the switching mode power supply operates in a light load or an open load condition, the first supply module 53 supplies a first power with a voltage level higher than that of the second power. Consequently, since the switch circuit 51 includes the direction element 511, the first power supplied by the first supply module 53 is directed to the controller chip 3, while the second power supplied by the second supply module 55 is not directed to the controller chip 3.

It follows from the above description that the present invention provides a power supply module capable of increasing the efficiency of a power supply and decreasing the power loss incurred by a control circuit. The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A power supply module adapted to power a control circuit of a switching mode power supply, the power supply module comprising:
   a switch circuit;
   a first supply module coupled to the switch circuit;
   a second supply module coupled to the switch circuit and connected to the first supply module in parallel; and
   a determination module being configured to determine whether the switching mode power supply is in a light load status or an open load status, and to turn on the switch circuit when the switching mode power supply is in the light load status or the open load status so as to enable the first supply module to output a first power to the control circuit.

2. The power supply module of claim 1, wherein the switch circuit comprises:
   a switch element comprising an output terminal connected to the second supply module at a power output terminal thereof.

3. The power supply module of claim 2, wherein the switch circuit further comprises a resistor and the switch element further comprises an input terminal; the resistor is connected to a power output terminal of the first supply module and the input terminal of the switch element, so as to control current flowing through the switch circuit.

4. The power supply module of claim 1, wherein each of the first supply module and the second supply module comprises a winding and a rectification filter module connected to the winding.

5. The power supply module of claim 4, wherein each of the windings is coupled to a transformer.

6. The power supply module of claim 4, wherein each of the windings is coupled to two transformers.

7. The power supply module of claim 4, wherein each of the rectification filter modules comprises a capacitor and a rectification filter circuit connected to the capacitor.

8. The power supply module of claim 1, wherein the determination module determines that the switching mode power supply is in the light load status or the open load status when the determination module determines that a voltage of a second power supplied by the second supply module is smaller than a predetermined voltage.

9. The power supply module of claim 1, wherein the determination module determines that the switching mode power supply is in the light load status or the open load status when the determination module determines that a voltage of a first power supplied by the first supply module is smaller than a predetermined voltage.

10. The power supply module of claim 1, wherein the determination module is further configured to receive a work mode signal, and to determine whether the switching mode power supply is in the light load status or the open load status according to the voltage of the work mode signal.

11. The power supply module of claim 10, wherein the determination module is further configured to output a control signal for turning on the switch circuit.

12. The power supply module of claim 1, wherein the switch circuit comprises:
- a switch element connected to a power output terminal of the first supply module; and
- a direction element having a first terminal connected to a power output terminal of the second supply module and a second terminal connected to the switch element;
- wherein the first supply module supplies a voltage of a first power greater than a voltage of the second power when the switching mode power supply is in the light load status or the open load status.

13. The power supply module of claim 12, wherein the direction element is a diode, the first terminal is a P-electrode, and the second terminal is an N-electrode.

* * * * *